United States Patent

[11] 3,607,764

| [72] | Inventors | Homer E. Crotty;<br>Michael T. Zalzal, both of Cincinnati, Ohio |
|---|---|---|
| [21] | Appl. No. | 701,829 |
| [22] | Filed | Jan. 31, 1968 |
| [45] | Patented | Sept. 21, 1971 |
| [73] | Assignee | W. R. Grace & Co.<br>New York, N.Y. |

[54] GLASS WASHING COMPOUND AND PROCESS
4 Claims, No Drawings

[52] U.S. Cl. ................................................. 252/139,
252/158
[51] Int. Cl. ........................................................ C11d 3/075
[50] Field of Search ............................................ 282/135,
156, 139, 158

[56] References Cited
UNITED STATES PATENTS

| 2,976,248 | 3/1961 | Otrhalek | 252/156 |
|---|---|---|---|
| 3,463,735 | 8/1969 | Stonebraker et al. | 252/135 X |
| 3,010,907 | 11/1961 | Carroll | 252/156 X |
| 3,168,478 | 2/1965 | Stefcik et al. | 252/156 X |
| 3,210,287 | 10/1965 | Kelly et al. | 252/139 |
| 3,293,148 | 12/1966 | Deil et al. | 252/156 X |
| 3,308,066 | 3/1967 | Murphy et al. | 252/156 X |

*Primary Examiner*—Mayer Weinblatt
*Assistant Examiner*—Arnold J. Rady
*Attorney*—Kenneth E. Prince ABSTRACT: Glassware is washed with an aqueous solution of a washing compound comprising from 25 to 75 parts alkali metal hydroxide, 5 to 25 parts alkali metal tripolyphosphate, 5 to 25 parts tetra-alkali metal pyrophosphate, 5 to 25 parts of a hydroxy carboxylic acid sequesterant, from 5 to 20 parts of a glycol ether, from 0.2 to 10 parts of a nonionic polyalkoxylated surfactant, and from 0 to 25 parts of sodium carbonate. By this process, all types of typical soils found on laboratory glassware as well as permanent marking inks used in the pharmaceutical industry are removed.

GLASS WASHING COMPOUND AND PROCESS

This invention relates to a glass washing composition which is highly effective to remove all types of typical soils found on laboratory glassware in the pharmaceutical industry as well as less adherent soils and, at the same time with no impairment of the other cleansing action, removes permanent marking inks normally used with laboratory glassware.

In summary, the glass washing composition of this invention is an alkaline cleaning composition for cleaning glassware such as laboratory glassware marked with permanent inks comprising from 25 to 75 parts by weight of an alkali metal hydroxide, from 5 to 25 parts by weight of an alkali metal tripolyphosphate, from 5 to 25 parts by weight of a tetra-alkali metal pyrophosphate, 5 to 25 parts by weight of a hydroxy carboxylic acid sequesterant, from 5 to 20 parts by weight of an alkylene glycol alkyl ether having from 2 to 9 carbons in the alkylene group and from 1 to 4 carbons in the alkyl group or groups, from 0 to 25 parts by weight of sodium carbonate, from 0.2 to 10 parts by weight of a water soluble nonionic surfactant selected from the group consisting of condensation products of aliphatic alcohols with from 5 to 50 moles of ethylene oxide per mole of aliphatic alcohol; condensation products formed by condensing alkylene oxides having from 2 to 3 carbons with alkylene glycols having from 2 to 3 carbons, at least 50 percent of the condensation product being oxyethylene groups, the condensation product of alkyl phenols having from 4 to 12 carbons in the alkyl group with from 5 to 30 moles of ethylene oxide per mole of alkyl phenol, and mixture thereof. In summary, the process of this invention is a method for washing glassware comprising the steps of applying an aqueous solution of from 1 to 6 weight percent of the above described glass washing composition and a temperature of from 130° to 180° F. to the surface of the glassware, preferably by spraying, and rinsing the glassware.

Glass washing compounds containing caustic soda and hydroxycarboxylic acids have been previously disclosed in U.S. Pat. Nos. 2,615,846 and 2,976,248, for example. These compositions have been found to be very effective cleaners of ordinary glassware such as in the dairy, brewery and soft drink industries. Their use to clean soils and marking inks from laboratory glassware in the pharmaceutical industry, however, has not been found completely satisfactory. In particular, laboratory glassware is often marked with identifying symbols using permanent marking inks. These inks are pigmented, oil soluble inks which are water, acid and alkaline resistant, and normally used for marking laundry and bare surfaces such as metal or glass. These previously known glass cleaning compositions would not efficiently remove both soils and marking inks from laboratory glassware. Addition of further components which might improve the ink removal activity of the glass washing compounds was beset with continued difficulties since the additional ingredients were often incompatible and usually interfered with the detergent activity of the caustic soda and sodium gluconate ingredients. Some ingredients left residue deposits on the glassware.

It is the object of this invention to provide a glass cleaning compound which efficiently removes all types of typical soils found on laboratory glassware in the pharmaceutical industry and, in addition, removes permanent marking inks. It is another object of this invention to provide a process for removing all types of soils including marking ink from laboratory glassware, without deterring the soil-removal activity of the glass cleaning compound.

All concentrations are given herein as parts by weight or weight percents unless otherwise specified.

In general, the glass cleaning composition of this invention

Table A

|  | Weight Percent Operable | Preferred |
| --- | --- | --- |
| Alkali metal hydroxide | 25–75 | 45–55 |
| Alkali metal tripolyphosphate | 5–25 | 5–15 |
| Tetra-alkali metal pyrophosphate | 5–25 | 5–15 |
| Sequesterant | 5–25 | 5–15 |
| Glycol ether | 5–20 | 5–15 |
| Nonionic surfactant | 0.2–10 | 0.2–10 | is a mixture of the ingredients shown in table A.

The alkali metal hydroxide can be sodium hydroxide, potassium hydroxide, or mixtures thereof. Milder alkaline materials as sodium or potassium carbonate, or sodium or potassium orthophosphates can be substituted to a limited extent for some of the hydroxide. For example, 0–20 weight percent of the alkali metal hydroxide can be replaced with orthophosphates or carbonates or mixtures of these materials. Preferably, however, sodium hydroxide is used as the alkaline component. The condensed phosphates used in the composition of this invention include sodium and/or potassium tripolyphosphate, and tetrasodium and/or tetrapotassium pyrophosphate. A small proportion, up to 25 percent of the condensed phosphates, can be replaced with sodium or potassium hexametaphosphate, but the preferred condensed phosphates are sodium tripolyphosphate and tetrasodium pyrophosphate in the proportions shown in Table A.

The hydroxycarboxylic acid sequesterant used in the process of this invention can be, in general, any hydroxycarboxylic acid or water-soluble salt thereof which is referred to as a chelating agent, complexing agent, inhibitor, sequestering agent or stabilizing agent. These compounds have from 3 to 7 carbons and have, as functional groups, hydroxy and carboxylic acid groups. Preferably they have only carbon, hydrogen, and oxygen atoms. Examples of these hydroxycarboxylic acids include but are not limited to lactic, citric, tartaric, gluconic, arabonic, galactonic, 2-ketogluconic, saccharic, mucic and glucoheptonic acids. Mixtures of two or more of these acids as well as their sodium or potassium salts are also suitable in the compositions of this invention. Preferably, the sequesterant is sodium gluconate.

The glycol ether component in the composition of this invention is highly critical for effective removal of permanent marking inks without impairment of the glass cleaning properties of the other components. Suitable glycol ethers include alkylene glycol alkylethers having from 2 to 9 carbons in the alkylene group and from 1 to 4 carbons in the alkyl group or groups including but not limited to: ethylene glycol monobutyl ether, ethylene glycol methyl ether, ethylene glycol ethyl ether, diethylene glycol methyl ether, diethylene glycol ethyl ether, diethylene glycol n-butyl ether, and tripropylene glycol methyl ether, for example.

The nonionic surfactants which can be employed in the composition of this invention include the condensation products of aliphatic alcohols having from 8 to 18 carbons, in either straight chain or branched chain configuration, with from five to 50 and preferably from 10–30 moles of ethylene oxide per mole of aliphatic alcohol. The aliphatic alcohol is preferably a fatty alcohol. Another type of nonionic surfactant which can be used is the condensation products of alkylene oxides having from 2–3 carbons with alkylene glycols having from 2–3 carbons, at least 50 weight percent of the condensation product being oxyethylene groups. Also, the condensation products of alkyphenols having from 4–12 carbons in the alkyl group with from 5–30 and preferably from 10–25 moles of ethylene oxide per mole of alkylphenol can be used. These nonionic surfactants have been disclosed in U.S. Pat. No. 3,318,817, for example.

The preferred alkaline cleaning composition is shown below in Table B.

Table B

|  | Weight Percent |
| --- | --- |
| Caustic soda | 53–55 |
| Sodium tripolyphosphate | 8–10 |
| Tetrasodium pyrophosphate | 8–10 |
| Sodium gluconate | 8–10 |
| Ethylene glycol monobutyl ether | 5–8 |
| Ucon 50-HB-3250[a] | 1–3 |
| Antarox BL 330[b] | 0.2–0.5 |

(a) Polyalkylene glycol
(b) Ethoxylated higher fatty alcohol

For cleaning of laboratory glassware, aqueous solutions containing from 1 to 5 and preferably from 2.5 to 3 weight percent of the composition of this invention are used.

In the process of this invention, an aqueous solution containing from 1 to 5 and preferably from 2.5 to 3.0 weight percent of the above alkaline cleaning composition and having a temperature of from 130 to 180° F. and preferably from 140 to 160° F. is applied to the glass surfaces to be cleaned. Although any technique can be used for applying the alkaline solution to the glassware, it is specifically designed for and is highly effective when used with automatic spray washing equipment of the type conventionally used in cleaning laboratory glassware, as well as glassware in the soft drink, brewery, and dairy industry. In the final step in the cleaning process, the glassware is thoroughly rinsed with water.

The highly sequestered, highly alkaline cleaning composition of this invention is highly effective to remove the soils found on ordinary glassware such as cooking and table glassware, bottles and other glassware used in the dairy, brewery, and soft drink industry. It is particularly suitable for cleaning all types of typical soils found on laboratory glassware in the pharmaceutical industry, because it is not only highly effective to remove these soils, but also removes permanent marking inks normally used to mark laboratory glassware. The particular components used in the alkaline cleaner cooperate to remove permanent marking inks without impairment of the normal glass cleaning activity.

This invention is further illustrated by the following specific but nonlimiting examples.

Example 1

The following cleaning composition was mixed with water in proportions of 4 ounces of the cleaning composition per gallon of water, and at a temperature of 170° F., was used in a spray washer in a drug company. It proved to be highly effective. Not only were the laboratory soils removed from the glassware, but the permanent marking inks were also removed.

Table C

|  | Weight Percent |
| --- | --- |
| Caustic Soda | 54.75 |
| Soda Ash | 6.0 |
| Sodium Tripolyphosphate | 10.0 |
| Tetrasodium pyrophosphate | 9.0 |
| sodium gluconate | 10.0 |
| Ethylene glycol monobutyl ether | 8.0 |
| Ucon 50-HB-3520(a) | 2.0 |
| Antarox BL 330(b) | 0.25 |

(a) Polyalkylene glycol
(b) Ethoxylated higher fatty alcohol

Example 2

The following cleaning composition was mixed with water in proportions of 3.5 ounces of the cleaning composition per gallon of water, and at a temperature of 145° F., was used in a spray washer in a drug company. It was shown to effectively clean as well as being nonfoam at the low temperature. All soil and permanent marking inks were removed.

Table D

|  | Weight Percent |
| --- | --- |
| Soda ash | 10.0 |
| Caustic soda | 53.0 |
| Sodium tripolyphosphate | 10.0 |
| Tetrasodium pyrophosphate | 9.0 |
| Sodium gluconate | 9.0 |
| Ethylene glycol monobutyl ether | 6.0 |
| Ucon 50-HB-3520 | 2.5 |
| Polytergent S-305LF(c) | 0.5 |

(c) Ethoxylated higher fatty alcohol

Example 3

The following composition used at 4 ounces per gallon at 170° F. in a high pressure spray washer for cleaning typical soil found in hospital central glass washing was found to be very effective. Both permanent ink and red marking crayon were completely removed.

Table E

|  | Weight Percent |
| --- | --- |
| Caustic soda | 63.0 |
| Sodium tripolyphosphate | 10.0 |
| Tetrasodium pyrophosphate | 9.0 |
| Sodium gluconate | 9.0 |
| Ethylene glycol n-butyl ether | 6.0 |
| Antarox BL-330 | 3.0 |

Obviously, many modifications and variations of the invention as hereinabove set forth can be made without departing from the essence and scope thereof, and only such limitations should be applied as are indicated in the claims.

The invention claimed is:

1. An alkaline glassware cleaning composition for removing ink markings from laboratory glassware consisting of:
   a. from 25 to 75 parts by weight of sodium or potassium hydroxide;
   b. from 5 to 25 parts by weight of sodium or potassium tripolyphosphate;
   c. from 5 to 25 parts by weight of a tetrasodium pyrophosphate or tetrapotassium pyrophosphate;
   d. from 5 to 25 parts by weight of a hydroxycarboxylic acid sequesterant selected from the group consisting of gluconic and glucoheptonic acid;
   e. from 5 to 20 parts by weight of an alkylene glycol ether selected from the group consisting of ethylene glycol monobutyl ether, ethylene glycol methyl ether, ethylene glycol ethyl ether, diethylene glycol methyl ether, diethylene glycol ethyl ether, diethylene glycol n-butyl ether, and tripropylene glycol methyl ether;
   f. from 0.2 to 10 parts by weight of a water soluble nonionic surfactant selected from the group consisting of (I) the condensation products of 1 mole of alkanol having from 8 to 18 carbons with from 5 to 50 moles of ethylene oxide, (II) the condensation products formed by condensing alkylene oxides having from 2 to 3 carbons with alkylene glycols having from 2 to 2 carbons, at least 50 weight percent of condensation products II being oxyethylene groups, and (III) the condensation products of 1 mole of alkyl phenol having from 4 to 12 carbons in the alkyl group with from 5 to 30 moles of ethylene oxide; and
   g. from 0 to 25 parts by weight of sodium carbonate.

2. The composition of claim 1 which consists of:
   a. from 45 to 55 parts by weight of the hydroxide;
   b. from 5 to 15 parts by weight of the tripolyphosphate;
   c. from 5 to 15 parts by weight of the pyrophosphate;
   d. from 5 to 15 parts by weight of the hydroxycarboxylic acid sequesterant;
   e. from 5 to 15 parts by weight of the alkylene glycol alkyl ether;
   f. from 0.2 to 10 parts by weight of the water soluble nonionic surfactant; and
   g. from 0 to 25 parts by weight of sodium carbonate.

3. The composition of claim 1 which consists of:
   a. from 53 to 55 parts by weight of sodium hydroxide;
   b. from 8 to 10 parts by weight of sodium tripolyphosphate;
   c. from 8 to 10 parts by weight of tetrasodium pyrophosphate;
   d. from 8 to 10 parts by weight of sodium gluconate;
   e. from 5 to 8 parts by weight of ethylene glycol monobutyl ether;
   f. from 1 to 3 parts by weight of water soluble nonionic surfactant; and
   g. from 0 to 25 parts by weight of sodium carbonate.

4. An aqueous solution containing from 1 to 5 weight percent of the composition of claim 1.